United States Patent [19]

Velazquez

[11] Patent Number: 5,191,585
[45] Date of Patent: Mar. 2, 1993

[54] COMPUTER NETWORKING METHOD

[75] Inventor: Juan F. Velazquez, Saline, Mich.

[73] Assignee: Secom Information Products Company, Mich.

[21] Appl. No.: 318,124

[22] Filed: Mar. 2, 1989

[51] Int. Cl.[5] .............................................. G06F 11/10
[52] U.S. Cl. ..................................................... 371/53
[58] Field of Search ...................... 340/310 A, 310 R; 371/35, 37.1, 53

[56] References Cited

U.S. PATENT DOCUMENTS

| | | | |
|---|---|---|---|
| 4,642,607 | 2/1987 | Strom et al. ..................... | 340/310 A |
| 4,815,106 | 3/1989 | Propp et al. ........................... | 375/36 |

OTHER PUBLICATIONS

Muheim, J., "BBC's PARTNERBUS-A Communication Bus Linking Computers in Local Area Networks", Brown Boveri Review, May 1985, pp. 241-248.

Stutzman, B., "Data Communication Control Procedures", Computing Surveys, vol. 4, No. 4, Dec. 1972, pp. 197-220.

Stallings, W., Local Networks, 3rd ed., Macmillan, 1990, pp. 156-157.

Primary Examiner—Stephen M. Baker
Attorney, Agent, or Firm—Dykema Gossett

[57] ABSTRACT

A computer networking method is disclosed, including methods of building packets of information, transmitting packets of information, and processing information received from another device in a network, wherein when data packets are built, they are initially built only with an address appended to the data in the packet but once a threshold level of failed transmission is encountered, a second type of information packet is built having error correcting means built therein.

8 Claims, 12 Drawing Sheets

DATA AS RECEIVED

```
              T       (01010100)  ← BIT CORRUPTED BY NOISE
              U       (01000101)
              S       (01010011)
       CHECKSUM       (11101100)

T       (01010100)
            (sp)      (00100000)
              M       (01001101)
       CHECKSUM       (11000001)

⎧(00000000)
  X'OR OF THE         ⎪(01100101)
  TWO UPPER DATA      ⎨(00011110)
  BLOCKS              ⎩(10000011)
```

Fig-9B

```
              T       (01010100)
              E       (01000101)  ← CORRECTED BIT
              S       (01010011)
       CHECKSUM       (11101100)

T       (01010100)
            (sp)      (00100000)
              M       (01001101)
       CHECKSUM       (11000001)

⎧(00000000)
  X'OR OF THE         ⎪(01100101)
  TWO UPPER DATA      ⎨(00011110)
  BLOCKS              ⎩(10000011)
```

COMPUTER NETWORKING METHOD

BACKGROUND OF THE INVENTION

1. Field of the Invention

The present invention deals with methods which may be used for building and transmitting packets of information over networks, as well as a method which may be used to process information that is received from a sending device on a network, which enables any errors in the received data caused by noise in the network to be corrected. Thus, any networking apparatus utilizing my method will be provided with improved means for building data packets, improved means for transmitting data, and improved means for error correction of data.

2. Description of the Prior Art

Up until the present invention, the emphasis in the networking art has been to find methods, and therefore apparatus, which have higher and higher efficiencies of transmitting data to effectively increase the networking speed. One such method with which I am familiar simply appends an address bit onto 128 bits of information, to form a common data packet, and once a minimal handshaking architecture is established between the sending and receiving device, proceeds to transmit with an efficiency approaching an ideal one hundred (100%) percent, i.e., 128/129 bits of data are usable, for a theoretical efficiency of ninety-nine (99%) percent.

However, this efficiency is never achieved, except under ideal conditions, which in themselves almost never exist, because if even one bit of data is destroyed by noise, the system using this method has no alternative except to keep on trying to retransmit all 128 bytes in the packet until they are received error-free. There are no means for error correction in the system to reconstruct bytes of information, and no way to retransmit only those bytes of information which could not be reconstructed.

After analyzing the problems with the aforementioned methods of data transmission, I have concluded that much higher actual efficiencies can be realized by providing a means for error correction in the data when information is being processed for transmission, said means for error correction then being useable by the receiving apparatus to reconstruct data blocks which may have been destroyed by noise on the system. However, in order not to reduce the efficiency of the system in any greater degree than is necessary, under conditions where very little noise would be expected on the system, I will begin my transmission method by sending blocks of data with nothing other than the address code appended thereto (Type 1 packet), but I will provide for a threshold limit should noise appear, such that after a given number of attempts to retransmit a packet of information, the apparatus using my method will automatically start appending the information needed for error correction into the data packets to form Type 2 data packets.

SUMMARY OF THE INVENTION

In order to solve the problems present in prior networking methods where high theoretical efficiencies in data transmission are never achieved due to the frequent need to retransmit entire packets of information, I provide a method where, under any but ideal conditions, as data packets are being built for transmission, the four data blocks forming the common minor block used to build data packets, eight of which form a major block, or data packet, are formed to have the necessary check sum bytes present in the first two data blocks such that the third data block can be an "exclusive OR" data block, and the fourth data block can have two bytes used for a minor block tag and two bytes used for re-synchronization, such that if either of the first two data blocks in a minor block is destroyed by noise in the system, it can be reconstructed by using the remaining data block and the "exclusive OR" data block, rather than having to retransmit entire packets of information.

Thus, it is an object of the present invention to provide a method of building data packets for transmission whereby the first data block of a minor block includes three data bytes plus one check sum byte, the second data block of a minor data block includes three data bytes plus one check sum byte, the third data block is an "exclusive OR" data block with a check sum, and the fourth data block has two bytes for a minor block tag, and two bytes for a re-synchronization code.

A further object of the present invention is to provide an improved method of transmitting data packets wherein a carrier will be raised on a power line for a predetermined length of time before the packet of information is transmitted.

It is a still further object of the present invention to provide an improved method for processing data received by a networking device wherein the transmitted check sum for each data block is compared to the calculated sum for each data block to determine if the data block is good or bad, and if one of said data blocks are bad, correction means in the form of an "exclusive OR" test is performed to reconstruct the bad data blocks.

It is a still further object of the present invention to provide a method of networking whereby actual efficiencies exceed those of methods having much higher theoretical efficiencies.

It is a still further object of the present method to provide a networking method which is much more efficient than previous networking methods by requiring retransmission of only erroneous minor blocks of data when data is corrupted by noise, rather than requiring retransmissions of full data blocks.

A further object of the present invention is to provide apparatus having means for performing the method of the present invention.

Further Objects and advantages of the present invention will be apparant from the following description and appended claims, reference being made to the accompanying drawings forming a part of this specification, wherein like referenced characters designate corresponding parts in the several views.

It is to be understood that the present invention not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
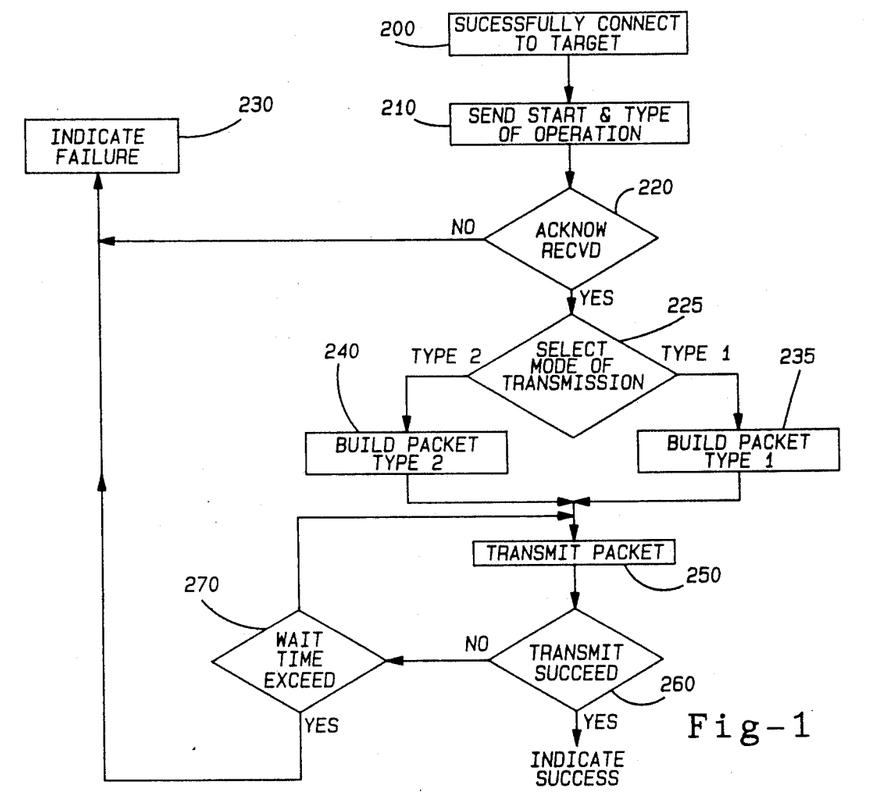
FIG. 1 is a flow chart showing how data is transmitted according to the method of the present invention.

My improved method has application in the networking field, both when a piece of equipment having information to send is in a condition to send such information and, therefore, is in a transmit mode, and also when a piece of equipment is in a condition to receive information over a network, or is in the receive mode. Referring now to FIG. 1, there is shown a flow chart illustrating the steps in my networking method, and more particularly showing how data is transmitted using those steps by a piece of equipment which is in transmit mode. In such a network system, when the equipment is in transmit mode, it will first successfully connect to another piece of equipment to which it is desired to transmit (Box 200), and then it will send a start and type of operation signal (Box 210) to enable the receiving piece of equipment to know that it has a message to transmit. At Box 220, if an acknowledgment is successfully received, the piece of equipment will then begin to build the packet of information to transmit, which is where my improved method is used. If an acknowledgment is not received, the system may indicate failure (Box 230) or take some other action which would be dictated by the program which controls the transmitting piece of equipment.

Assuming that the acknowledgment is received, a Type I packet of information would be built according to my method (Box 235) and then transmitted (Box 250). It should be understood according to my method that the application program preferably will always start to built Type 1 packets of information, which are common information packets having normally 128 bits of data, with an address appended thereto. After the packet of information is transmitted, the sending piece of equipment would determine if the transmission has succeeded by waiting for an acknowledgment (Box 260) from the receiving piece of equipment. If the transmission has not succeeded after a predetermined period of time, the question would be asked if the wait time has been exceeded (Box 270). If the wait time had not been exceeded, the transmitting piece of equipment would loop around to the beginning of the transmit packet Box 250 and again see if the information could be transmitted. If the wait time has been exceeded (Box 270), the system would indicate failure (Box 230) or take some other action dictated by the programming in the transmitting piece of equipment. If the transmit succeed signal has been received, the system would indicate success or take some other action as dictated by the program in the transmitting piece of equipment, which normally would be to send further packets of information.

As long as the noise on the line is relatively low and Type 1 packets of information are getting through without having to be retransmitted for over a predetermined number of times, my method will keep building Type 1 packets (Box 235). However, in those situations where excessive noise begins corrupting the data, and the threshold level for retransmission, which is determined by the application programmer, is exceeded, my method will automatically begin building Type 2 data packets as indicated in (Box 240).

Figure 2:
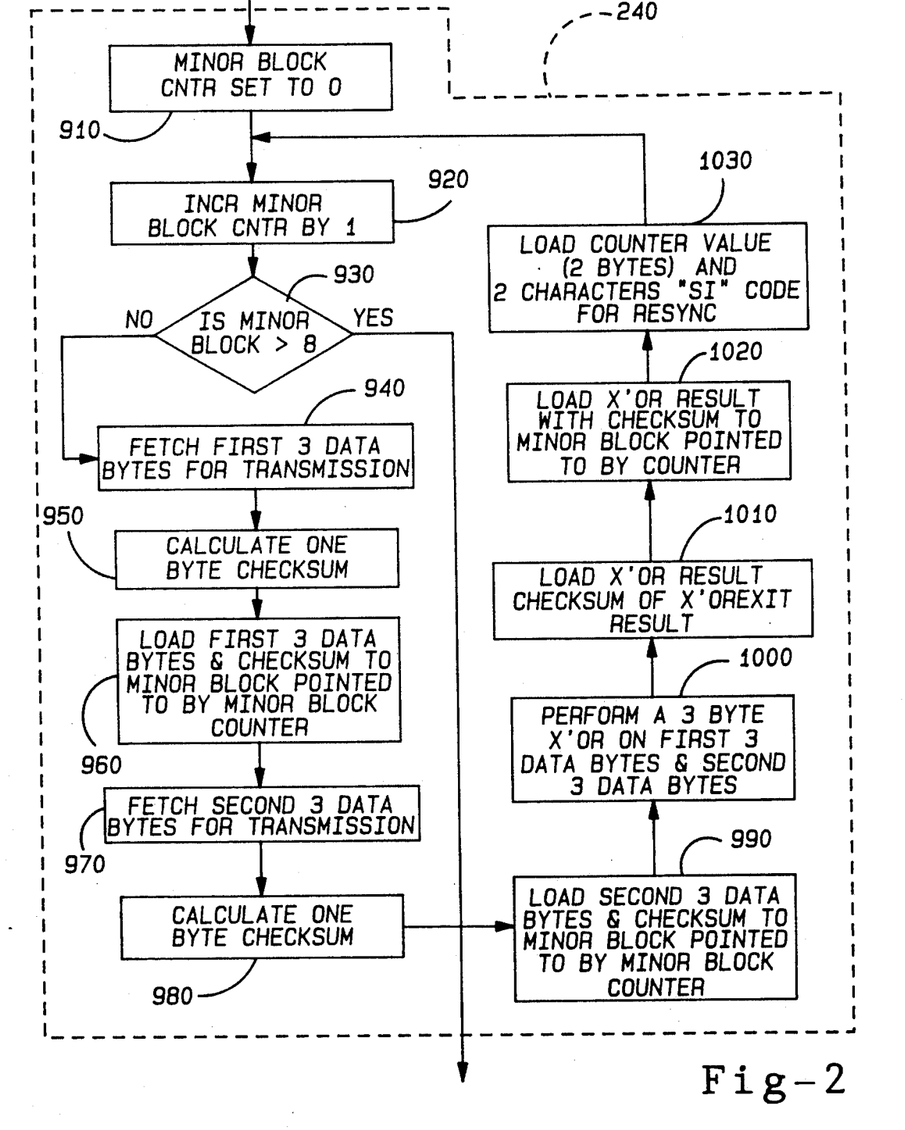
FIG. 2 is a flow chart showing in more detail the series of steps involved in building a Type 2 information packet.
Figure 5:
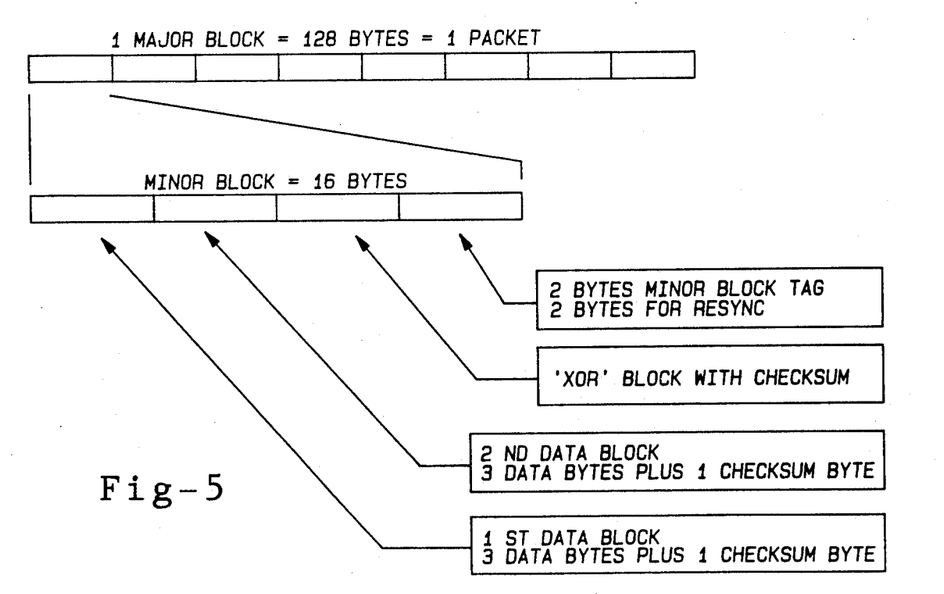
FIG. 5 is a diagrammatic view of showing how packets of information are built according to the method of the present invention.

How my improved method works to build the Type 2 information packet can now be seen by referring to FIG. 2, which shows Box 240 in greater detail. The first step is to build a packet of information consisting of 128 bytes, or 8 minor blocks, as shown in FIG.5. It should also be understood that each minor block consists of four data blocks, and each data block consists of four data bytes. This will be explained in greater detail in connection with FIG. 6.

The information packet is built by initializing a minor block counter at 0. (Block 910). The method next increments the minor block counter by 1 (Block 920), and goes to decision block 930 and asks the question: Is the minor block counter greater than 8?. If it is, of course, the method has succeeded in building the desired information packet, and one will simply proceed to the next step in the program, which will be to take the steps necessary to transmit the packet, as shown in Block 460 of FIG. 3.

But, of course, since we are just starting, the answer will be no, and next step is to fetch the first three pieces of information, or data bytes, to transmit (Box 940). A one byte check sum representing the value of the first three date bytes (Block 950) is calculated, and then the apparatus operating according to my method loads the first three data bites and the check sum into a minor block, as pointed to by the minor block counter (Box 960).

After this operation is completed, the apparatus will fetch the second three pieces of information, or three data bytes, it wishes to transmit (Box 970), and calculate a one byte check sum (Box 980) for these three data bytes. At Block 990 the second three data bytes, and its related check sum, are loaded into a related block pointed to by the minor block counter, and at this point one will have created the first and second data blocks of the minor block as shown in FIG. 5.

In order to be able to verify the data my method next involves calculating a three byte "exclusive OR" on the first three data bytes, and second three data bytes, and thus, we will obtain a value representing the value of the first three and second three data bytes. Next, a one byte check sum of the "exclusive OR" operation result (1010) will be calculated, and this TM exclusive OR T-M result, with its check sum, will be loaded into a minor block pointed out by the minor block counter, thus completing formation of the third block of the minor block shown in FIG. 5.

Next, my method will create the fourth data block of the minor block, and this is always a standard appended value which is loaded in as two bytes of information representing the position of the minor block within the major block shown in FIG. 5. Also, the next two characters will be the "SI" code for re-synchronization.

Once the packet of information is built, my improved method is used to transmit the packet of information more efficiently than could be done in the prior art methods. The detail of the transmit packet (Block 250) can be seen by referring to FIG. 3. As soon as the packet is built according to the method shown in FIG. 2, the packet needs to be transmitted to the other piece of equipment for which it is intended. In accordance with my method, it is first checked to see if there is a carrier present on the power lines, for if a carrier is present, it means that a transmission is already taking place from some other piece of equipment on the line, and this transmission should not be interferred with.

Figure 3:
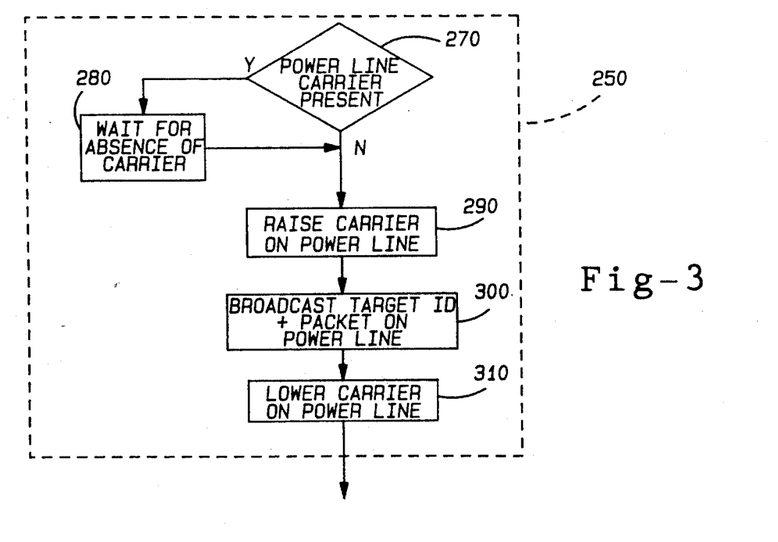
FIG. 3 is a flow chart showing in more detail the series of steps used in the method of transmitting packets of information.

If a carrier is present (Box 270), the system will wait for the absence of a carrier (Box 280). When there is an absence of a carrier, a carrier will be raised on the power line (Box 290) for a predetermined amount of time before an actual transmission is made, to alert the transmission is about to take place, as will be hereinafter described. After the carrier is raised on the power line, the packet of information, with the identification of the piece of equipment which is to receive the information (target) appended onto the packet, is broadcast on the power line. By broadcast, it is meant that all of the receiving pieces of equipment have the capability to receive the packet of information, but only that piece of equipment whose identification matches the target identification appended onto the packet will actually receive the information and transmit it past the networking apparatus. After this is broadcast, the carrier will be lowered on the power line (Box 310), and this will complete the step of transmitting the packet.

After the packet is transmitted, the question will be asked if the transmission has succeeded (Box 260, FIG. 1). If the transmission has not succeeded, the question will be asked as to whether the predetermined wait time programmed into the system has been exceeded (Box 270). If it has not, the system will continue to try and transmit the data until the transmit succeed signal (Box 260) is received. If the wait time has been exceeded, the system will indicate failure (Box 230), or, if the transmission succeeds, the system will indicate success to the transmitting equipment and, depending upon the program written by the applications programmer, the system will attempt to send another packet of information, or will go on to other operations. Thus, my particular method of building and transmitting the packet allows for a more efficient transmission than has heretofore taken place, and it also has presented the information in a manner which can be utilized by the receiving device to efficiently process the information and correct any errors appearing in data due to noise on the line.

Figure 4:
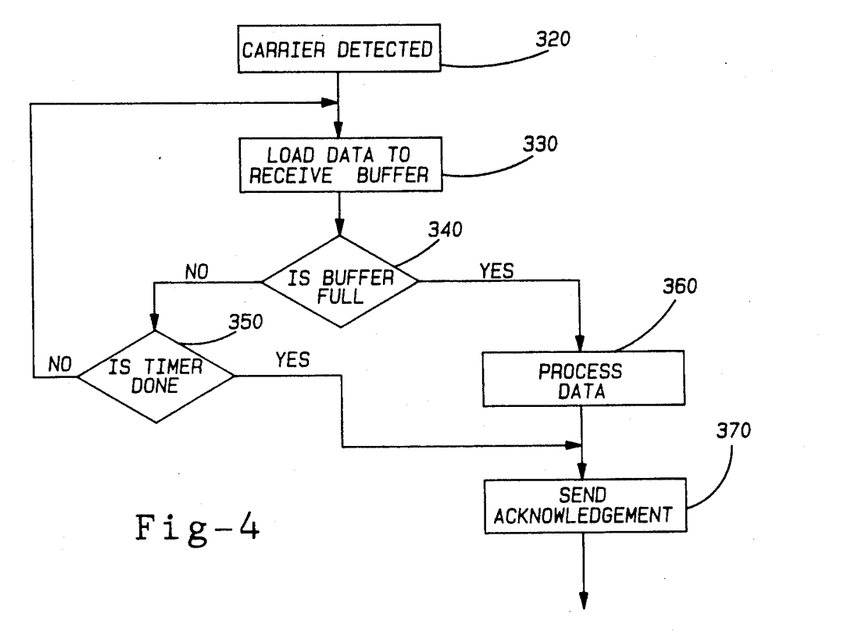
FIG. 4 is a flow chart showing the steps which a networking apparatus utilizing the method of the present invention would utilize in receiving and transferring information.

My novel method of processing data can be used by any networking system having the receiving piece of equipment to accept information. The steps which any networking apparatus would go through when it is ready to receive data may be seen by referring to FIG. 4. Whether the transmitting piece of equipment has used my improved method to build and transmit the data packet, or has used some other method to transmit the packet, the networking system will have raised a carrier on the power line prior to transmitting, and there will be a carrier detected (Box 320). Once the carrier is detected by the piece of equipment intended to receive the information, the intelligence present in said equipment, which will have been supplied by the applications programmer, will enable the receiving piece of equipment to load the data into a receiving buffer (Box 330). After the transmitted information is received, the question will be asked (Box 340) "Is the buffer full?". If the buffer is not full, the question will be asked (Box 350) "Is the timer done?". If the time has not run out, the system will loop back to Box 330, where additional data will be loaded into the receiving buffer until the buffer becomes full, and proceeds to Box 360 to process the data. It is in the processing of the data by a method which allows for error correction of data corrupted by noise on the line that the rest of my improved method is used.

Referring now to FIGS. 5, 6, 7 and 8, it can be seen how the data is processed and corrected. Referring first to FIG. 5, it will be recalled that at Box 240, where the packet of information was built, a major block was built consisting of 128 bytes of information. Each major block, in turn, consisted of a minor block of 16 bytes of information and each minor block, in turn, consisted of 4 data blocks of information. Therefore, each data block contains four data bytes. To understand the operation of the present method, it must also be understood that eight bits of information form one data byte. It is this type of major block that is received by the buffer at Box 700 in FIG. 7.

Figure 6A:
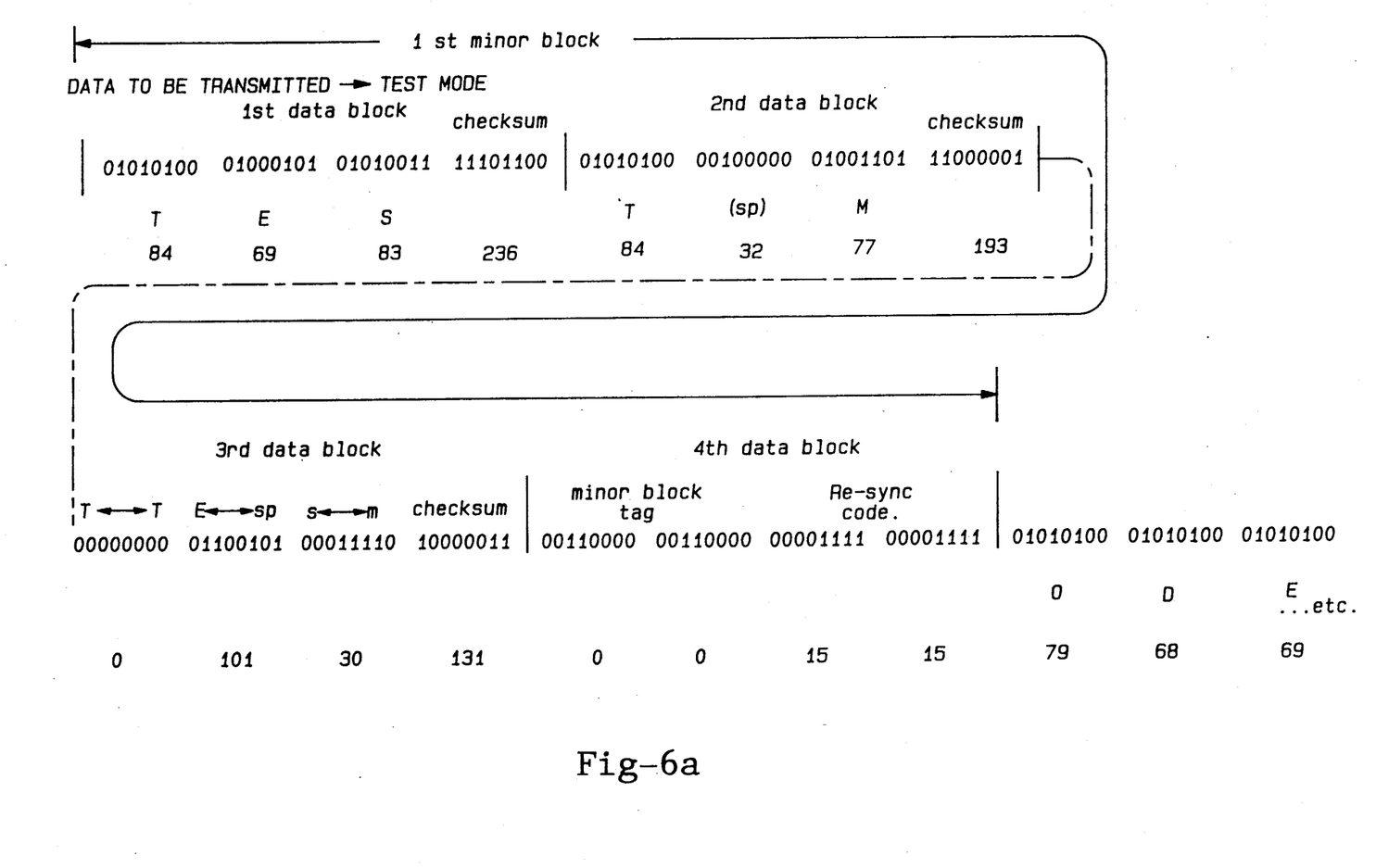
FIG. 6A is a diagrammatic view of actual information which may be embodied in the minor block shown in FIG. 5.

An example of an actual data packet is shown in FIG. 6, where it is desired to transmit the words "Test Mode" As shown in FIG. 6A, the first data block will consist of the ASCII codes for the first three characters, in other words, the letters T,E,S plus a check sum of the ASCII code, which is just the summation of the values of T, E and S. In this example, 84, 69 and 83 add up to 236. The second data block again consists of four data bytes which are three data bytes plus one check sum byte. In this case, the values for T, space, and M, together with a check sum of those values, which in this case is the value 193 in ASCII code.

As illustrated in FIG. 5, the third data block would again consist of four data bytes. In this case, the first three data bytes would be "exclusive OR" data bytes, with the fourth data byte being the check sum of three "exclusive OR" data bytes. In the example we are using, the first "exclusive OR" value would be the result of the "exclusive OR" test applied according to my method, which involves comparing the first data byte of the first data block with the first data byte of the second data block, or in other words, comparing the letter T with the letter T, then comparing the letter E with the space, and the letter S with the letter M. According to the rules for applying the "exclusive OR" test, when a bit by bit comparison is made, if the two bits are identical, a zero is entered. If the two bits are different, a one is entered. As can be seen by the example in FIG. 6, the first "exclusive OR" data byte of the third data block is all zeros because a bit by bit comparison of two identical ASCII values will result in an "exclusive OR" of all zeros.

Figure 6B:
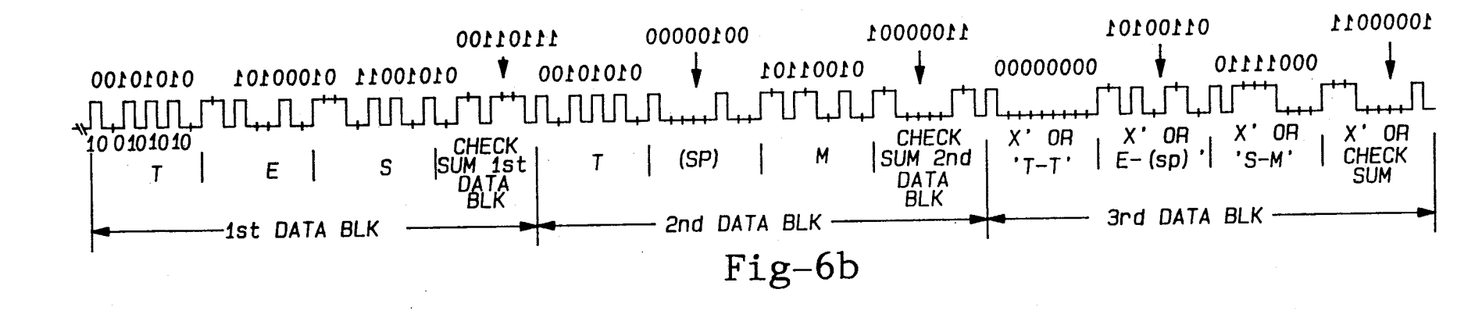
FIG. 6B is a diagrammatic view showing how a portion of the information shown in FIG. 6A is actually transmitted.
Figure 6C:
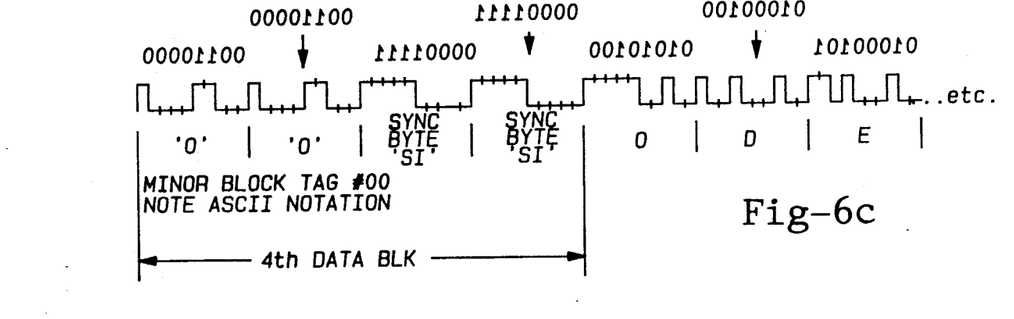
FIG. 6C is a diagrammatic view showing how the remainder of the information contained in FIG. 6A is transmitted.

On the other hand, when the E is compared with the space, the "exclusive OR" representation in ASCII code will be "01100101" because the characters have several instances where the bit by bit comparisons differ. Likewise, the third data byte of the exclusive OR block, when the value S is compared with the value M, will have a representation "00011110" and the check sum of this will be "10000011". The last data block of the minor block has two bytes for a minor block tag, and two bytes for a re-syncronization code. The minor block tag will simply be the representation of the minor block within the major block, and will be a value from "00" to "07" representing the first through the eighth position of the minor block in the major block. Then the data transmission would start over again with the letters ODE, etc. The actual values transmitted are shown in FIGS. 6B and 6C, and, as is well known in the art, when the data is actually transmitted, the mirror image of the ASCII code is used. Thus, FIGS. 6B and 6C would represent the actual transmission of the first minor block.

Figure 7:
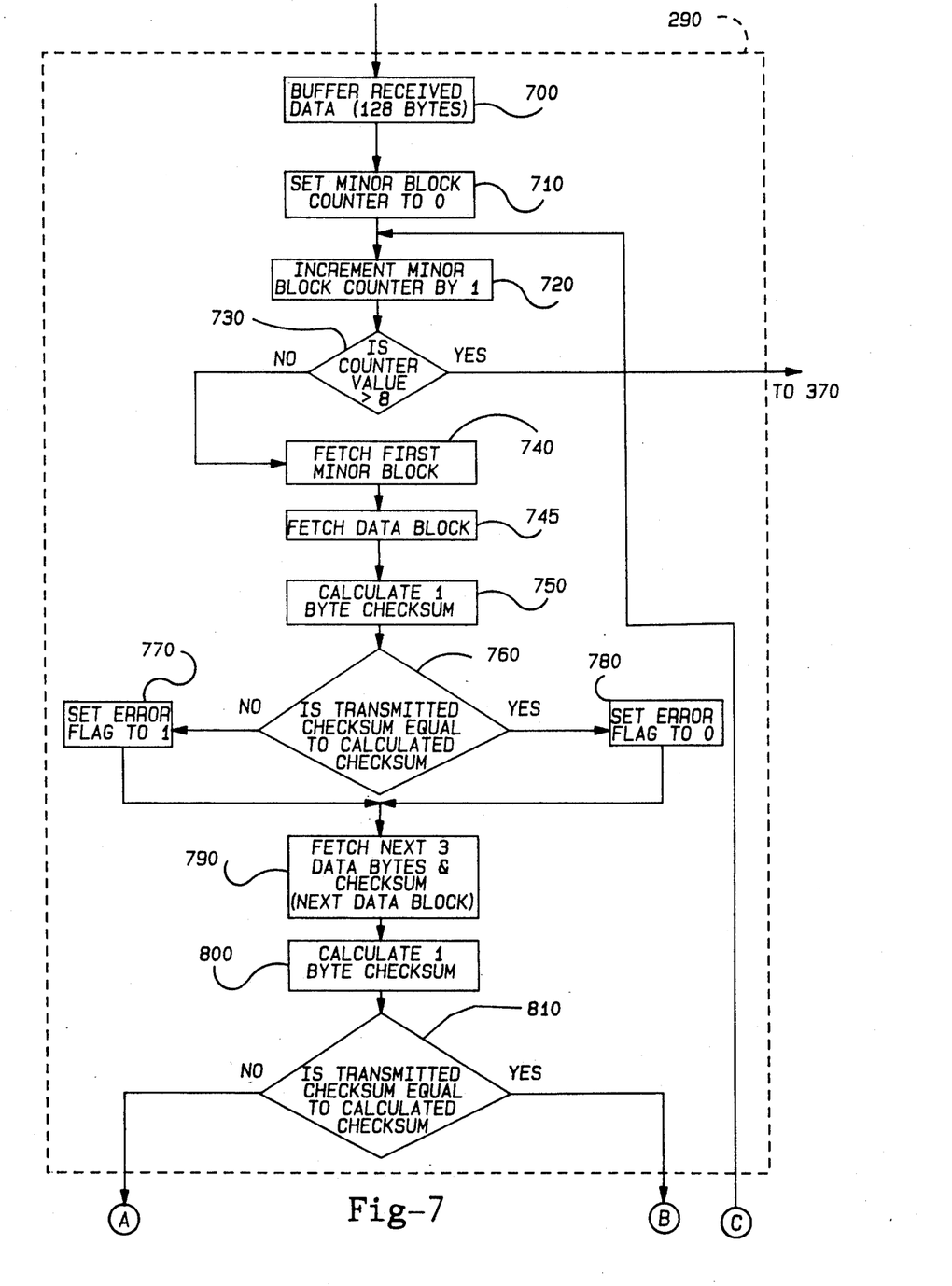
FIG. 7 is a portion of a flow chart showing in more detail the series of steps used in the method of processing data transmitted from another device on a network.

A process is then started to qualify or to remove all of the tags and all the corrections that were embedded in the data. In other words, I now try and extract the 48 characters of data out of the 128 bytes that were received. At Block 710, I initialize a counter to 0. At Block 720 the counter is incremented by 1, so now the block counter pointer is pointing to number 1, meaning that we are going to qualify minor block number 1. At Block 730 a check is made to determine if the whole 128 characters has been received, or, in other words, have we gotten through 8 major blocks.

If the answer to that is no, then the first step would be to fetch the first minor block (Block 740), fetch the first data block of the minor block (745), calculate the check sum (Box 750), compare the calculated check sum against the transmitted check sum (Box 760). Two possible answers will result from this comparison, they are either equal, or not equal. If they are equal, it means that the three data characters received are good, in which case the error flag is set to 0. However, if the check sum does not compare with the transmitted check sum, then the error flag is set to 1, meaning that the first data block is in error. The next step is to fetch the next 3 data blocks (Box 790), and for each data block again calculate the check sum (Box 800), and again verify that the calculated check sum is equal to the transmitted check sum. The question will then be asked (Box 810): Is the transmitted check sum equal to the calculated check sum. If they are equal, the answer will be a yes, and if they are not, it will be a no.

Figure 8A:
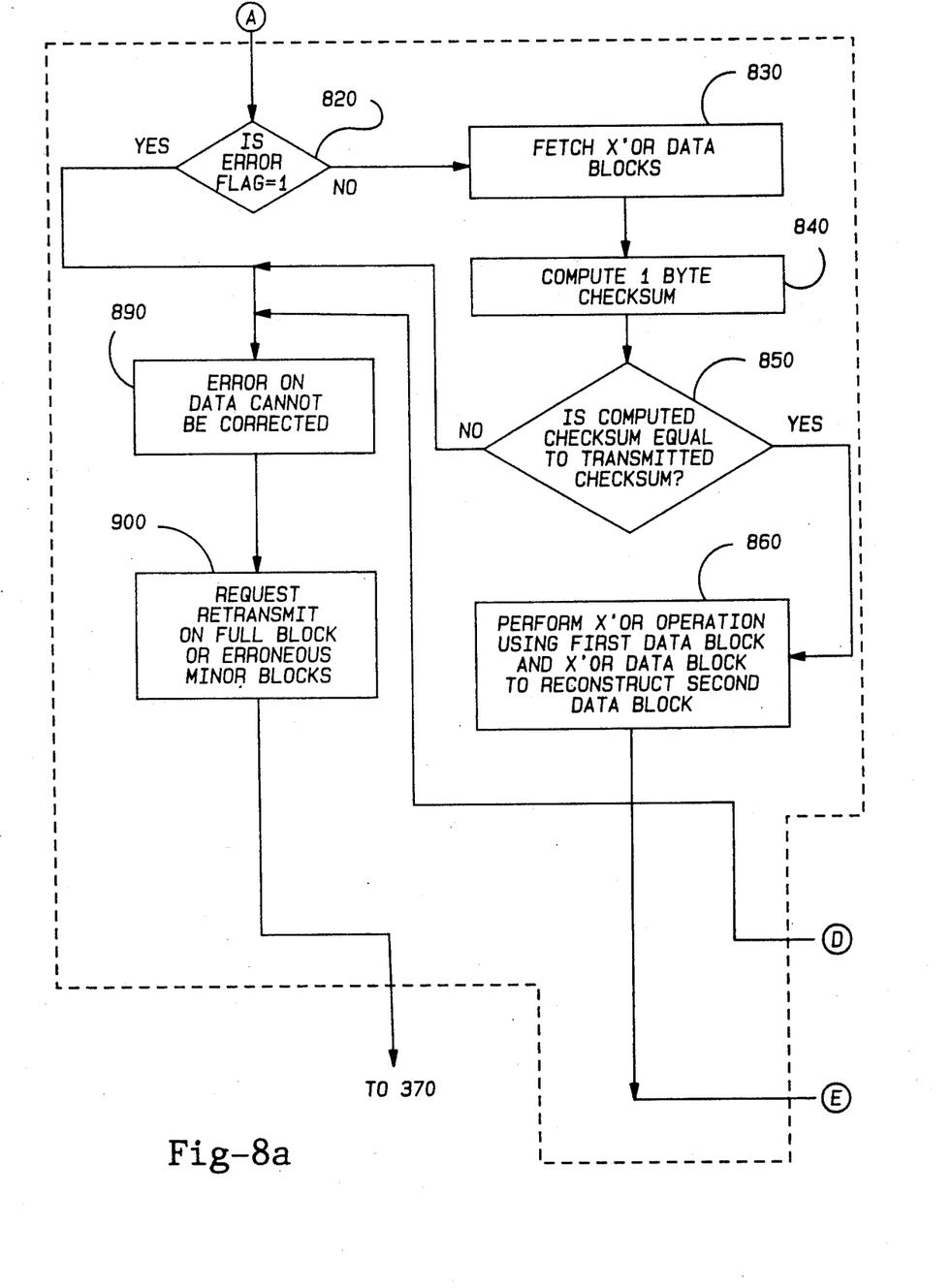
FIGS. 8A and 8B are a portion of a flow chart showing the remainder of the steps involved in the processing of the data received from another device on the network.

If the first data block is good, i.e. Box 760 is answered in the affirmative, and the error flag is set to zero at Box 780, and the second data block is good, i.e. decision box 810 is answered in the affirmative, and the error flag is not equal to one at Box 870, then the data is accepted.

Figure 8B:
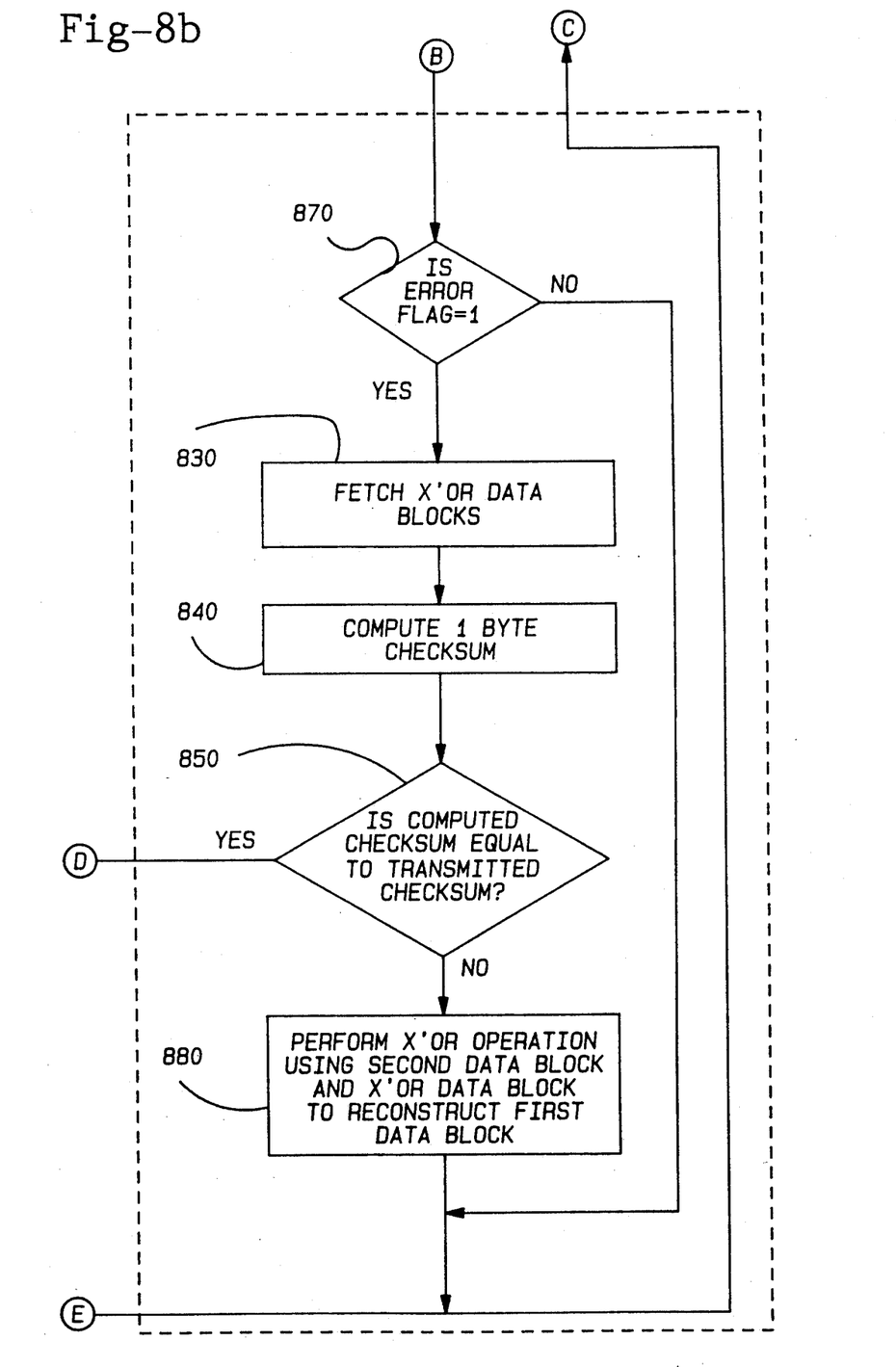

In the second situation, if the first data byte has an error in it, i.e. the error flag in box 770 is set to one, but the second data block is good, wherein the transmitted check sum is equal to the calculated check sum in Box 810, the question: Is the error flag equal to one? (Box 870) will be answered in the affirmative. then the questions are again asked (Box 830 thru Box 850) to verify the accuracy of an "exclusive OR" data block. If the computed check sum is equal to the transmitted check sum for the "exclusive OR" data block (Box 850), then the "exclusive OR" operation using the first data block and the "exclusive OR" data block can be used to reconstruct the second data block as will be explained below.

The third possible situation is that the first data block is correct, i.e. the transmitted check sum is equal to the calculated check sum in Box 760, but the second data block is wrong, i.e. the computed check sum is not equal to the transmitted check sum in box 850, then the second data block can still be reconstructed from the first data block and the "exclusive OR" data block.

Figure 9:
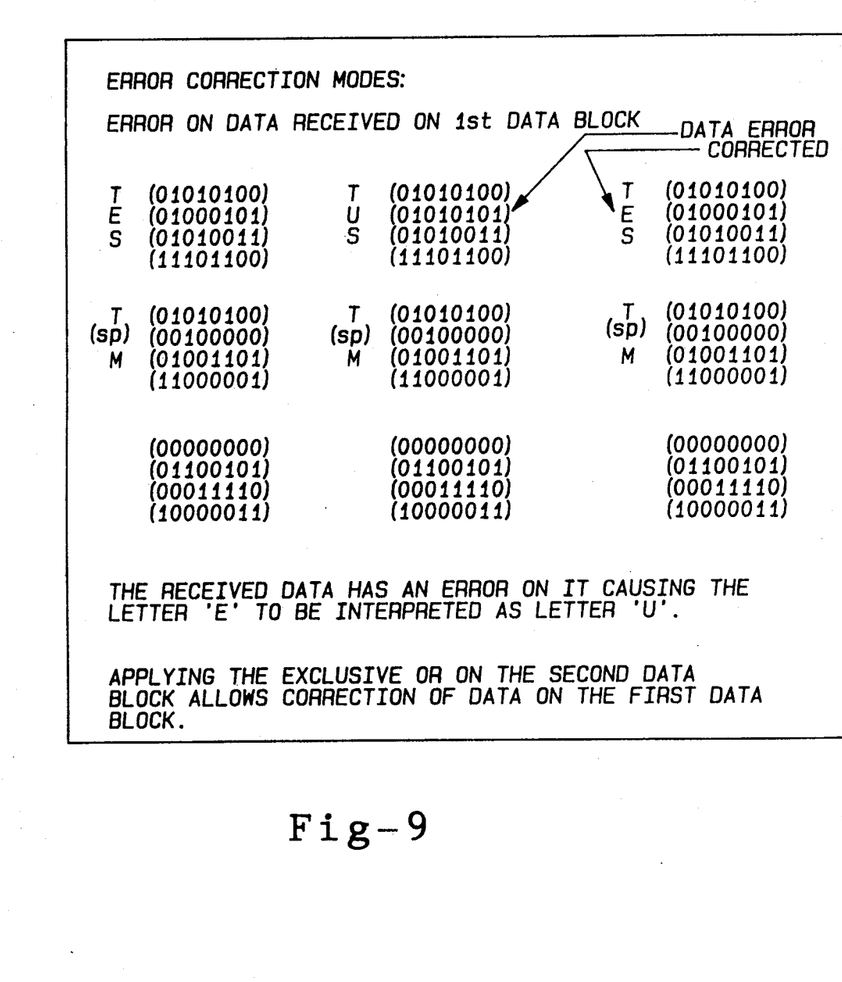
FIG. 9 is a chart showing certain information in ASCII notation.
Figure 9A:
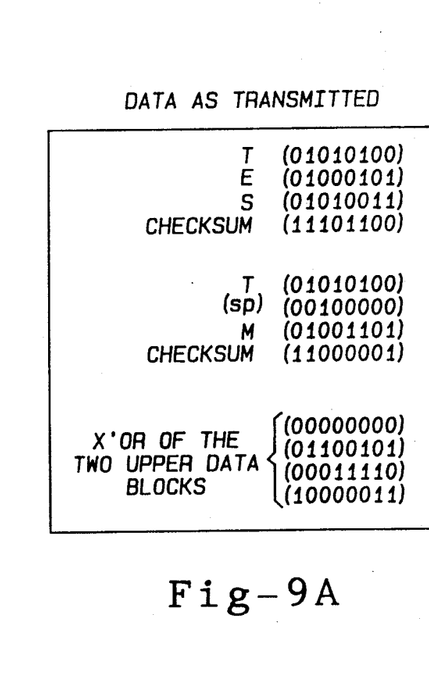
FIG. 9A is a chart showing how the information shown in FIGS. 6B and 6C would be represented in conventional ASCII notation. This is the bit pattern of the data transmitted.
Figure 9B:
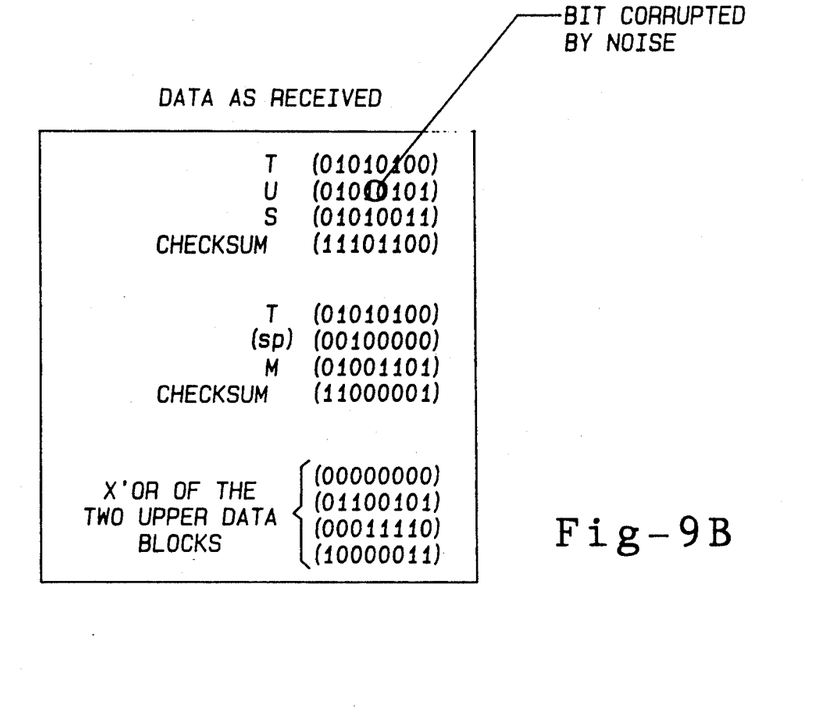
FIG. 9B is a chart similar in large part to FIG. 9A, but showing how a letter U could be received instead of the letter E when that is corrupted by noise on the network. The bit corrupted in the fourth position changing from a 'Q' to a 'l'. The interpretation of the new bit pattern would be a letter 'U' instead of a letter 'E' as intended.
Figure 9C:
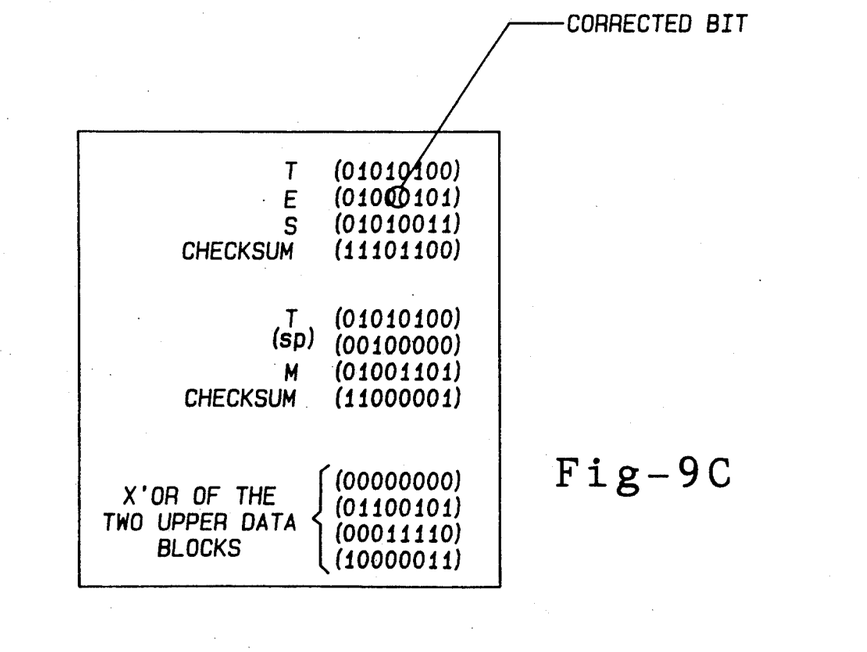
FIG. 9C is a diagrammatic view showing how the information contained in FIG. 9B is corrected using the "exclusive OR" (error correction) means of the present invention.

The fourth situation is when any two or more of the data blocks are in error, for example, the first and the second, or the first and the "exclusive OR", or the second and the "exclusive OR". Under this condition, the system cannot correct for the error, and therefore it will come out with a request to retransmit either the full block, or the minor block, depending on the application program. If an "exclusive OR" operation is to be performed (Box 860), an example of the operation that might be performed can be seen by referring to FIGS. 9A, 9B and 9C. An example of an error which may be due to noise is shown in the second data block illustrated in FIG. 9B, where the letter E has been received as the letter U. It can be seen that the error in the received data will be detected when the received check sum is compared with the calculated check sum. In this case, the calculated check sum for the characters T, E and S would be 236, and this would be the check sum transmitted. However, the calculated check sum for the characters T U and S would be 252. Thus, one would know that there is an error in the data received in the first data block that must be corrected. Since the first data block and the third data block were received correctly, it is known that the second data block is in error. So the second data block is then discarded, and an "exclusive OR" operation is performed between the first and the third data blocks. Since it is known that the check sums of the first and third data blocks are correct, the second data block can be reconstructed and will result in the proper value.

The same type of operation can be performed if the first data block is incorrect, and the second data block is correct. In this case, an "exclusive OR" operation would be performed between the second data block and the third data block, which is the "exclusive OR", to reconstruct the first data block. Whether the "exclusive OR" operation is used to reconstruct the second data block 860, or is used to reconstruct the first data block 880, as long as these operations are possible, the system then loops back to increment the minor block counter by one, and if the counter value is less than eight, it then fetches the next minoir block until all eight blocks are fetched to form the major block of data. When the process is complete, the counter value will be greater than eight. It will know that the major block has been fetched, and the process will proceed to Box 370, where an acknowledgement will be sent to the sending device that the data has been properly received.

If, however, two out of the first three data bytes of a data block were bad, then the error cannot be corrected (Box 890) and a request for retransmission of the full block or erroneous minor blocks, will be made (Box 900) when the acknowledgment is being transmitted (Box 870).

Figure 10A:
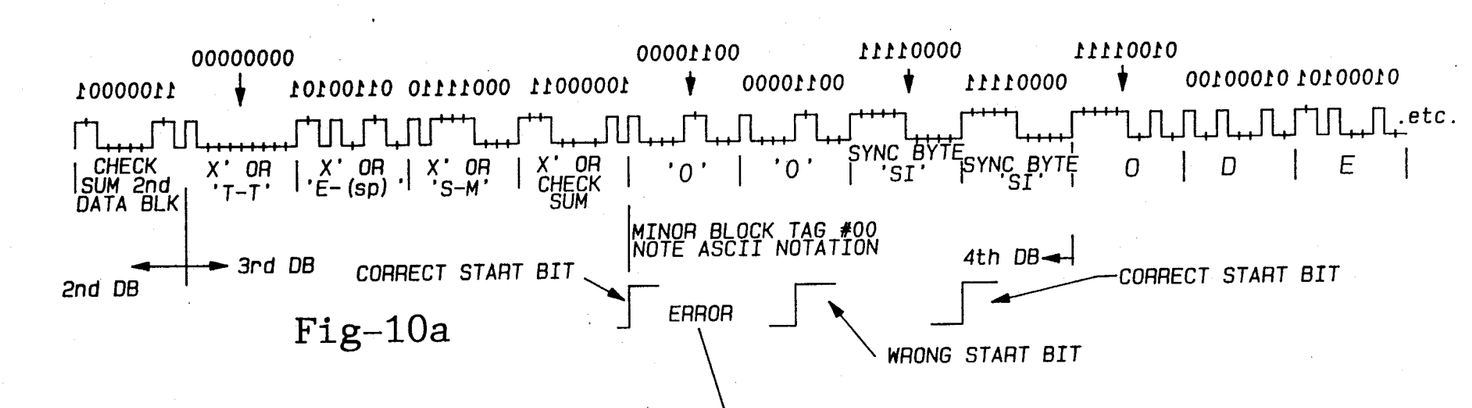
FIG. 10A is an illustration on an enlarged scale of portion of the information contained in FIG. 6B.
Figure 10B:
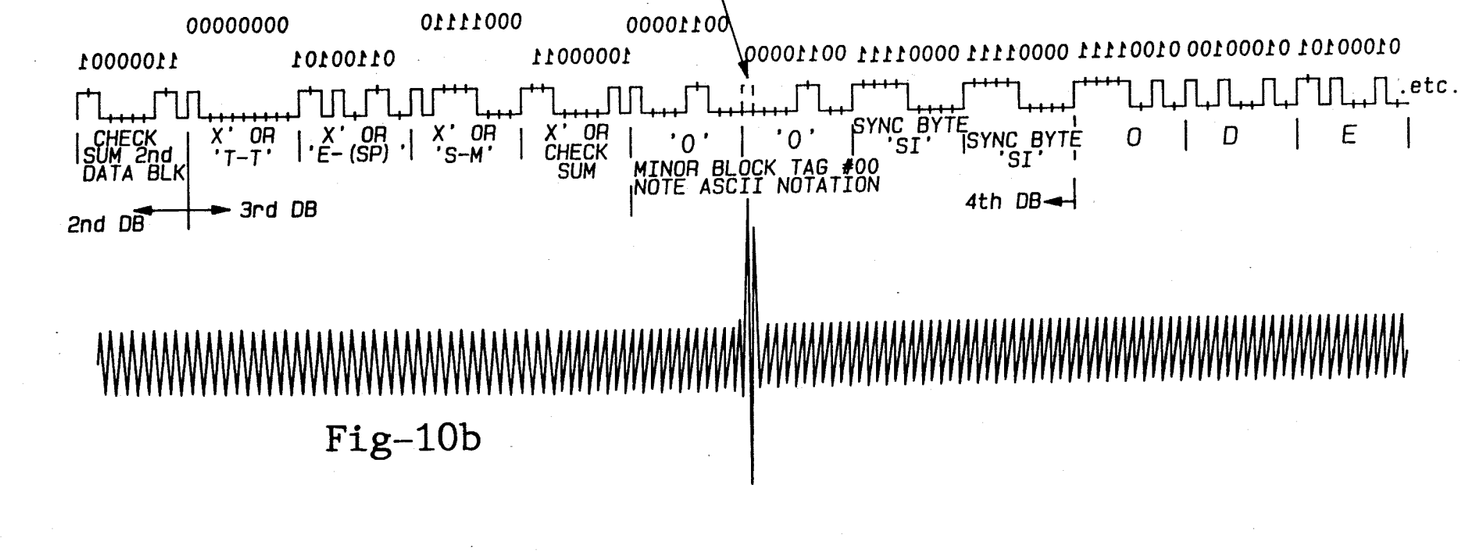
FIG. 10B is a view similar in large part to FIG. 10A, but showing how a corruption of a bit of data can lead to an apparatus reading a wrong start bit, and how the method of the present invention, by the use of "synch" bytes in every fourth data block, provides for re-synchronization of the network.

An example of the need for the re-synchronization code in bulding the data packet can be seen by referring to FIGS. 10A and 10B. FIG. 10A is a duplication of FIG. 6B and 6C, starting from the point labeled check sum second data block, and proceeding to the end. FIG. 10A would then represent the value being transmitted, while FIG. 10B represents a hypothetical value being received. As can be seen, FIG. 10A is identical to FIG. 10B until the beginning of the fourth data block in the first minor block, and more specifically the beginning of the second data byte of the fourth data block, where a one has been read as a zero due to noise in the system.

In this case, when the computer is finished reading the first data byte of the fourth data block, it will encounter a stop bit, and stop reading, rather than encountering immediately a start bit to continue the proper reading. It will then not encounter a start bit until the middle of the second data byte of the fourth data block, and will read an improper value, and continually read improper values unless the reading becomes re-synchronized with the correct start bit. This is performed by the "sync" bytes which are purposely loaded into the system, which, by definition, only have one transition per eight bits, which then forces the system to begin reading at a proper start bit for the first data block of the second minor block.

As previously described, these values then become the fourth data block, and complete a minor block of 16 bytes of information, as represented in FIG. 5. This operation is repeated until eight minor blocks, representing 128 bytes of information, are completed. The receiving apparatus, having used my improved method to receive one packet, continually repeats the step above until the buffer (Box 340) is empty, and then sends an acknowledgment (Box 370) to the sending device, which it is waiting to receive (Box 260).

Figure 11:
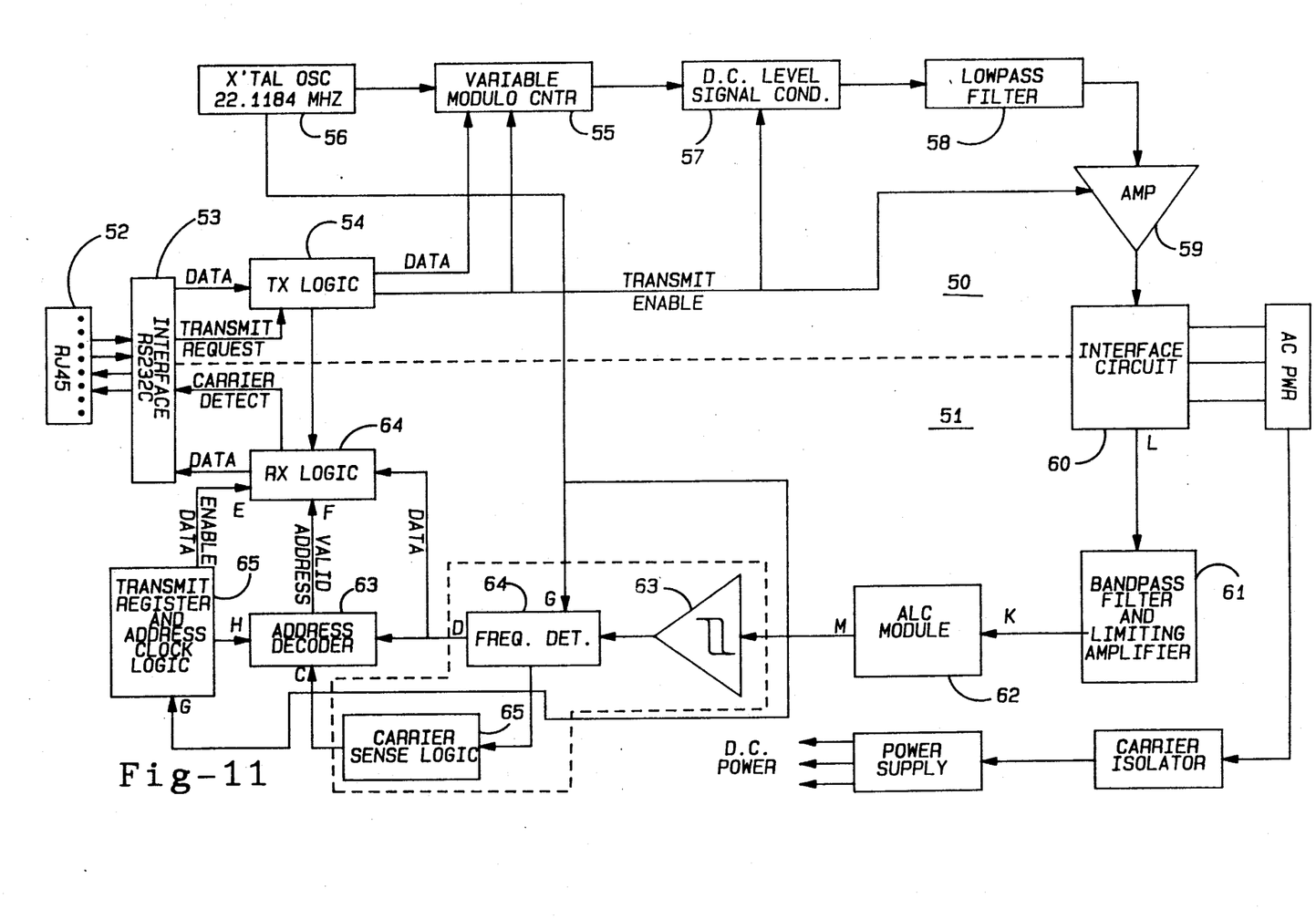
FIG. 11 is a diagramatic view showing an apparatus which may be constructed to practice the methods embodied by my invention.

An apparatus which may be used in the practice of the present invention is shown in FIG. 11. The apparatus can generally be said to have a transmit section 50 and a receive section 51. The sending and/or receiving device, such as a computer, is connected to by the means to connect, which in the illustrated apparatus, is in the form of an RJ45 interface 52 and the RS232C interface 53 data being received from the computer to be sent to a receiving device is supplied to the transmit logic 54 and there through to the variable modulo counter 55 which, with the aid of the crystal osolator 56, changes the logic zeros and logic ones received from the computer into fixed frequencies of two different values. The signals are conditioned in the DC level signal conditioner 57 and have unwanted frequencies removed by the low pass filter 58 before being supplied to the transmitting means in the form of transmitter amplifier 59. The networking apparatus is connected to a three wire installed conductor, in this case illustrated by an AC power line, by a means to connect in the form of the interface circuit 60.

When my networking apparatus is operating in its receive mode, the interface circuit 60 receives signals from the black wire of the AC power line and passes these through the band pass filter and limiting amplifier, which is provided to prevent damage to the rest of the receiving circuitry. The signal is then supplied to the automatic level control module 62, which is used to maintain a constant level signal. The signals are then passed through Schmitt-trigger 63, frequency detector 64, and carrier sense logic 65, which transmit the signals arriving at the two aforementioned fixed frequencies back into a series of logic zeros and logic ones to be transmitted to the receiving device, which may be such as a computer.

However, the signals must first pass through an address decoder 66, which determines if the address appended on to the data when the information packet is built matches the address of the receiving computer. If it does, the signal is passed through to the received logic 64 informing it that it is okay to pass the data through, and with the aide of the transmit register and address clock logic, the data is transferred? The transmit register and address clock logic 65 is needed to generate the correct frequency to allow the address decoder 63 to decode the address. The receiver logic is used to transfer the data being received to the means to connect.

Thus, I have provided a novel method of building information packets and transmitting information packets, as well as of processing data, all of which can be used with known apparatus. I have also shown a networking apparatus operating according to the method of the present information.

I claim:

1. A method of building a packet of information for transmission over a data network including the steps of:
    (a) setting a minor block counter to zero,
    (b) incrementing a minor block counter by one,
    (c) determining if said minor block counter is greater than eight, and if said minor block counter is not greater than eight,
    (d) fetching the first three data bytes for transmission,
    (e) calculating a one byte check sum, and
    (f) loading said first three data bytes and said check sum into a minor block pointed to by said minor block counter.

2. A method of building a packet of information for transmission over a data network wherein the steps set forth in claim 1 are not performed until a previously built data packet has failed to be transmitted for a predetermined number of times.

3. The method defined in claim 1 and including the additional steps of:
    (a) fetching the second three data bytes for transmission,
    (b) calculating a one byte check sum for said second three data bytes, and (c) loading said second three data bytes and said check sum into a further minor block pointed to by said minor block counter.

4. The method defined in claim 3 and including the further steps of:
(a) performing a three byte "exclusive OR" test on said first three data bytes and said second three data bytes, and
(b) calculating a one byte check sum of the "exclusive OR" test result.

5. A method of building a packet of information for transmission over a data network wherein the steps set forth in claim 3 are not performed until a previously built data packet has failed to be transmitted for a predetermined number of times.

6. A method of building a packet of information for transmission over a data network wherein the steps set forth in claim 4 are not performed until a previously built data packet has failed to be transmitted for a predetermined number of times.

7. The method defined in claim 4 and including the additional steps of:
(a) loading said "exclusive OR" result and said check sum into a still further minor block pointed to by said minor block counter,
(b) loading said counter value and two "synch" bytes into a fourth minor block pointed to by said block counter, and
(c) repeating all of said steps, except for initializing said minor block counter, until said data packets are formed for all data to be transmitted.

8. A method of building a packet of information for transmission over a data network wherein the steps set forth in claim 7 are not performed until a previously built data packet has failed to be transmitted for a predetermined number of times.

* * * * *